United States Patent Office 3,681,086
Patented Aug. 1, 1972

3,681,086
PROCESS FOR MAKING JAMS AND JELLIES
Raymond E. Cox, Los Angeles, and Robert M. Ehrlich, Sherman Oaks, Calif., assignors to General Foods Corporation, White Plains, N.Y.
No Drawing. Filed July 30, 1969, Ser. No. 846,290
Int. Cl. A23l 1/06
U.S. Cl. 99—129          3 Claims

ABSTRACT OF THE DISCLOSURE

Preparing jams and jellies by adding an aqueous slurry of finely ground fumaric acid powder coated with mono- and di-glycerides in an aqueous medium to cooked unacidified jam and jelly ingredients.

---

In recent years, the food industry has made increasing usage of adipic acid and fumaric acid as replacements for, or in conjunction with, well-known food acids such as citric acid, tartaric acid and succinic acid. Both adipic acid and fumaric acid have properties which lend themselves to wide application including low cost, desirable flavor and taste impact, and limited moisture absorption. However, both acids have relatively low solubility in water as contrasted with other food acids. Furthermore, as between adipic acid and fumaric acid, the latter is difficultly soluble even at temperatures above 100° F. Because of the relatively low solubility of fumaric acid in water and particularly in cold water, that is, water at a temperature at about 45° F., numerous procedures and improvements have been advanced for increasing the solubility rate of fumaric acid. Generally, such procedures and improvements have involved, inter alia, avoiding further crystal growth of fumaric acid particles; reducing the particle size of the acid crystals; employing additives such as surface active agents, wetting agents, dispersants, anti-caking agents, and chelating agents; and blending the powderous acid with sugars, sorbitol, and salt. Such procedures and improvements are further described in U.S. Pats. Nos. 3,009,810, 3,011,894, 3,016,299, 3,108,002, 3,151,986, 3,152,909, 3,169,872, 3,181,953, 3,181,954, 3,245,798, 3,250,624, 3,328,173, 3,330,665, 3,351,471 and 3,370,956. From the foregoing patents, it may be seen that the principal objectives have been to obtain a fumaric acid which is more readily soluble in cold water and is particularly adapted for use in beverage mixes. While dry beverage mixes should dissolve in cold water in very short periods of time and the use of fumaric acid having an improved rate of solubility in such beverage mixes represents a considerable advance, there are other areas in the food industry where a more quickly dissolving fumaric acid would be beneficial. In particular, in the manufacture of jams and jellies, having a fumaric acid with improved cold water dispersibility would be advantageous since the acid is added as late as possible in the manufacturing process so as to avoid sugar inversion and to prevent premature set. Obviously, with acids such as citric, tartaric and the like which have good solubility in both cold and hot water, the addition thereof to jams and jellies after the cooking stage usually presents no problem. Thus, these food acids used in normal jam and jelly making are employed as solutions of 30 to 50% concentration at room temperature. On the other hand, the solubility characteristics of fumaric acid are such so as to limit its applicability in jams and jellies because, as has been noted above, fumaric acid is relatively insoluble in water at a temperature of about 100° F. Moreover, even in water at a temperature of about 160° F., citric acid is approximately eight times as soluble as fumaric acid. At water temperature of 200° F., the solubility of fumaric is still only about 9.8%. Accordingly, if a fumaric acid solution is to be used, its concentration even at elevated temperatures is quite low thereby necessarily resulting in a rather unattractive and cumbersome technique for addition to jams and jellies. Thus, the use of dilute acid solution necessitates constant water adjustment to account for evaporation. Further, the jam—or jelly—base has to be concentrated to a higher soluble solids level than normally done so as to compensate for the addition of more water from the very dilute fumaric acid solution.

It is an object of this invention to prepare a fumaric acid-containing composition which has an increased rate of dispersibility in cold water. It is a further object of this invention to obtain a fumaric acid-containing composition which may be used in the manufacture of jams and jellies as well as in other food industry applications including beverages, desserts, and the like.

It has now been discovered that the rate of dispersibility of fumaric acid may be increased by mixing fumaric acid with mono- and di-glycerides of fatty acids. It is not known exactly in what manner these derivatives of fatty acids, particularly those of fat-forming fatty acids, improves the rate of dispersibility of fumaric acid. However, it appears that the mono- and di-glycerides may have a solubilizing effect over and above that which is obtained by particle size reduction. Moreover, it would seem that the mono- and di-glycerides act as both wetting and dispersing agents for fumaric acid even though their generally suggested application is as antifoaming agents.

In preparing the fumaric acid-containing composition according to the present invention, the fumaric acid is preferably ground to effect size reduction of the particles. Particle sizes of finer than 100 U.S. Standard mesh are desirable and particle sizes so that about 75% of the fumaric acid powder or crystals pass through 150 U.S. Standard mesh are preferred.

The finely ground fumaric acid powder may then be mixed with mono- and di-glycerides of fat-forming fatty acids employing an amount of mono- and di-glycerides that will be sufficient to coat the fumaric acid particles but not an amount sufficient to cause clumping of the particles. Generally, for each part by weight of fumaric acid up to about 0.5% by weight of mono- and di-glycerides may be employed and preferably the amount by weight will range between 0.2% and about 0.4%. The fumaric acid and mono- and di-glycerides are blended by intimate mixing so as to coat the particles uniformly. Optionally, the mono- and di-glycerides may be applied to the surfaces of the fumaric acid particles from a suitable solvent such as propylene glycol, ethyl alcohol or isopropyl alcohol after which the excess solvent is removed. If desired, the coated finely ground fumaric acid powder may be further reduced in size to, say, about 200 to 400 U.S. Standard mesh. The application of the mono- and di-glyceride coating may take place over a range of temperatures whether or not a solvent is employed and it has been found that intimate mixing at room temperatures is generally adequate.

Typical mono- and di-glycerides which may be utilized to prepare the fumaric acid-containing composition having increased rate of dispersibility in cold water include those commercially available as Atmos 300, Atmul 84. Others, however, may be used.

The fumaric acid-containing composition coated with mono- and di-glycerides is especially well adapted to be used in the manufacture of jams, preserves and jellies, especially pactin-based products. The use of the fumaric acid-containing composition of this invention overcomes disadvantages which have been noted in attempts to add uncoated fumaric acid to unacidified jams, preserves and jelly preparations. Thus, if an approximately 10% fumaric acid solution is prepared and is maintained at a temperature of 200° F. for adding to unacidified jam, preserve and jelly batches, costly equipment is needed to maintain the 200° F. solution at its 10% concentration. Moreover, there is reluctance to add the hot acid solution to the batches since local precipitation may result.

The fumaric acid-containing composition of this invention, however, may be employed as a cold or room temperature water slurry at concentrations ranging from about 30 to about 50%. In the slurry, the acid is thoroughly wetted due to the mono- and di-glyceride coating. The wetted powdered fumaric acid slurry disperses readily in the hot jam or jelly base and solubilization is almost instantaneous at the low acid concentration of the final jam or jelly. On the other hand, attempts to disperse fumaric acid without such coating in a slurry at the above-noted concentrations are not feasible since the fumaric acid particles tend to clump and rise to the surface of the water. Thus, complete solubilization of uncoated or granular fumaric acid when added to a jam or jelly base even at temperatures of 180° F. and higher is difficult to achieve.

The following examples represent embodiments of the present invention, but it is to be understood that the examples are merely illustrative.

EXAMPLE 1

One hundred parts of fumaric acid having a particle size of 100 U.S. Standard mesh is mixed with 0.3 part of a mixture of mono- and di-glyceride fat-forming fatty acids (commercially available at Atmos 300) at room temperature. The mixture of a fumaric acid and mono- and di-glycerides is well blended in a suitable liquid-solid blender such as a P & K or Day mixer.

A 37%, by weight, slurry of the coated fumaric acid powder so obtained is then prepared by dispersing the powder in 170 parts of water at room temperature.

EXAMPLE 2

Batches of grape jellies are prepared in quantities scaled down from commercial production formulations in order to evaluate the coated fumaric acid-containing composition of this invention against uncoated fumaric acids, powdered and granular, having a range of particle sizes.

The jellies are made using a conventional open kettle cooking technique.

The formula used in the making of the jellies is as follows:

| | Grams |
|---|---|
| Grape juice | 1080 |
| Sugar | 1280 |
| Slow-set pectin (150 grade) | 8 |
| Fumaric acid (4 milliliters of 37% slurry as prepared in Example 1) | 2.5 |

In preparing the jellies, the pectin is blended with about 30 grams of sugar and the blend is then added to cold water and heating of the blend is continued until a solution is obtained. After the grape juice is added and this mixture is heated further, the remaining sugar, about 1250 grams, is added. The mixture is cooked and boiled until the desired solids level of 65% is reached. The cooking vessel is removed from the heat and the contents are allowed to cool to about 190° F. The scum is skimmed off and the fumaric acid slurry is added while the jelly batch is at 180° F. to 190° F. The jelly mixture is then poured immediately into containers and capped.

In jelly batches prepared with fumaric acid coated with mono- and di-glycerides of fat-forming fatty acids (Atmos 300) at a 0.3% level, solubilization in the jelly was noted to be complete since there were no clumped acid particles in the cold water slurry and the final acid concentration in the jelly was less than 0.2%. By contrast, the use of uncoated fumaric acid of various particle sizes was found to require extensive processing modifications in the making of the jellies. Moreover, jellies prepared with the cold water slurry of coated fumaric acid had both uniform grade and pH, whereas jellies prepared with the uncoated fumaric acids did not.

It will be apparent that there are variations and modifications of this invention and that the examples, preferred proportions and ingredients, and typical operation procedures may be varied without departing from the spirit of the invention.

We claim:
1. A process for making jaw and jellies which comprises
   (A) slurrying finely ground fumaric acid powder coated with mono- and di-glycerides of fatty acids in an aqueous medium;
   (B) adding said slurry to unacidified jam and jelly ingredients after cooking thereof.
2. A process as in claim 1 in which said slurry contains from about 20 to about 50% fumaric acid.
3. A process as in claim 2 in which said jams and jellies are pectin-based.

References Cited

UNITED STATES PATENTS

| 2,935,408 | 5/1960 | Steinitz | 99—131 X |
| 3,009,810 | 11/1961 | Raffensperger et al. | 99—78 |
| 3,152,909 | 10/1964 | Raffensperger et al. | 99—78 |
| 3,470,213 | 9/1969 | Marquis | 99—78 X |
| 3,492,128 | 1/1970 | Brennan et al. | 99—95 |

FOREIGN PATENTS

| 1,109,344 | 4/1968 | Great Britain. |

OTHER REFERENCES

Schwitzer, M. K., Margarine and Other Food Fats, Interscience Publishers Inc., New York, 1956, pp. 88, 97–98 and 112.

RAYMOND N. JONES, Primary Examiner

J. M. HUNTER, Assistant Examiner

U.S. Cl. X.R.

99—132